March 30, 1943.   H. BOOTHROYD   2,315,041
PERFORATING MACHINE PROVIDED WITH CLUTCH CONTROL MECHANISMS
Original Filed Jan. 25, 1940

INVENTOR
Hubert Boothroyd
By his attorney

Patented Mar. 30, 1943

2,315,041

UNITED STATES PATENT OFFICE 2,315,041

PERFORATING MACHINE PROVIDED WITH CLUTCH CONTROL MECHANISMS

Hubert Boothroyd, Leicester, England, assignor to United Shoe Machinery Corporation, Flemington, N. J., a corporation of New Jersey Original application January 25, 1940, Serial No. 315,505, now Patent No. 2,257,087, dated September 30, 1941. Divided and this application March 28, 1941, Serial No. 385,604. In Great Britain February 17, 1939

1 Claim. (Cl. 164—105)

This invention relates to perforating machines and is herein illustrated as embodied in a machine for forming cut-out openings in shoe uppers. Mechanism herein disclosed but not claimed, and relating particularly to means for positioning a die in the machine, formed the subject-matter of a copending application Serial No. 315,505, filed January 25, 1940, in my name and which eventuated in United States Letters Patent No. 2,257,087, granted September 30, 1941. The instant case is a division of the aforementioned application as to all matters claimed herein.

One type of perforating machine, which is commonly used for cutting ornamental openings in shoe parts, comprises a reciprocating plunger carrying a die arranged to be moved toward and away from a work support in performing cutting operations upon blanks positioned upon the support. It is an object of the invention to provide an improved perforating machine of the type referred to, having mechanism by which control of the power-operation of the machine is facilitated.

To this end and as illustrated, I have provided a perforating machine in which there is a plunger movable heightwise of the work support, and having a die secured thereto, power means for driving the plunger and means for manually moving the die into engagement with work positioned upon the support prior to a power-operation of the plunger, thereby to facilitate location of the work accurately relatively to the cutting edges of the die without the use of gages, there being additional means to prevent power-operation of the machine until this preliminary movement has been effected. Preferably and as shown, the plunger is operated by connections extending to a drive shaft arranged to be connected to a power pulley by a clutch. In order to prevent repetition of the machine, as well as to provide for holding the die down upon the work, as is sometimes desired in performing embossing operations, means is provided for disengaging the clutch from the shaft after the power means has forced the cutting edges of the die through the work, said means being manually operated by a treadle rod, and the construction and arrangement of the parts being such that the treadle rod must be released in order to cause reengagement of the clutch to complete the cycle of operation of the machine.

These and other features of the invention are disclosed in the following specification and accompanying drawing and are pointed out in the claim.

Figures 2, 3, 4:
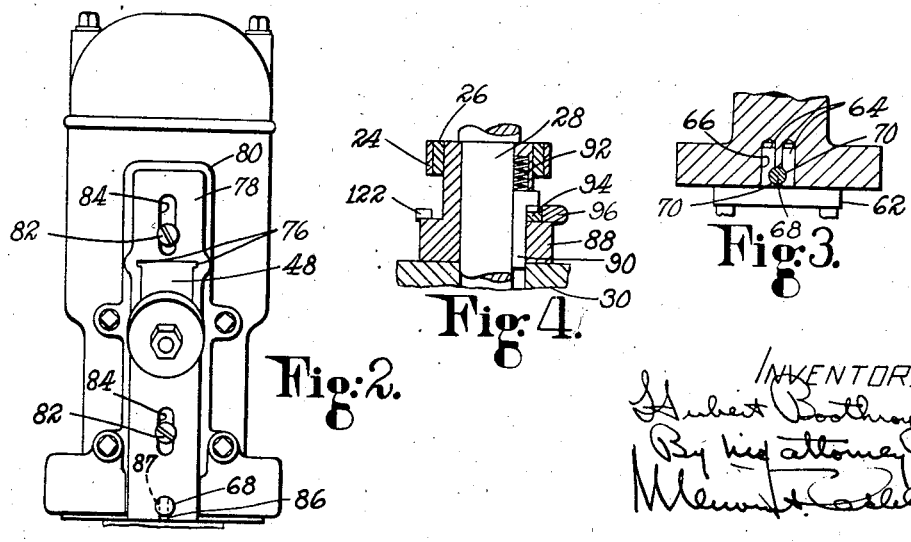
Fig. 2 is a front view of the upper portion of the machine.
Fig. 3 is a sectional view taken along line III—III of Fig. 1.
Fig. 4 is a sectional view taken along line IV—IV of Fig. 1.

The illustrative machine comprises a C-shaped frame 10 carrying a work support 12 and a cutting die 14 movable heightwise of the frame toward and away from the work support in producing cutting operations upon sheet material, such as a shoe upper blank positioned upon the support. The die 14 is secured to the lower end of a plunger 16, which is slidably mounted in the frame and arranged to be moved downwardly by a block 18 pivotally mounted upon the end of a bell crank lever 20 carried by a shaft 22 and arranged to be oscillated by a link 24 driven by an eccentric 26 upon a drive shaft 28, the drive shaft being arranged to be connected by means of a clutch 32 to a pulley 30 (Fig. 4). A spring 34 extending between the block 18 and the plunger 16 is operable normally to maintain the plunger in engagement with the lower surface of the block.

The die 14 is arranged for a preliminary movement toward the work support 12 prior to each operation of the machine, in order to facilitate accurate positioning of the work relatively to the die. To this end, the plunger 16 is provided with a pin 36, which extends through an elongated slot 38 in the frame. The pin 36 is connected to one end of a lever 40 mounted on a pivot 42, there being a treadle rod 44 for operating the lever in such manner as to cause the plunger to move the die downwardly toward the work support against the resistance of the spring 34.

Mechanism is provided for adjusting the effective length of the plunger 16 in order to adapt the machine for use in connection with dies of different heights. In view of this, the upper end of the plunger 16 comprises a wedge member 48 positioned in a groove 46, the upper surface of the wedge being normally maintained in engagement with the block 18 by the spring 34. The under face of the wedge member 48 is inclined downwardly toward its forward end and rests upon a similarly sloping face forming the bottom of the groove 46. The wedge member 48 is adjusted by a threaded stem 50 passing rearwardly through a downturned lug 52 at the forward end of the wedge member and is threaded into a hole in the plunger 16. The stem 50 is secured against endwise movement relatively to the wedge member 48 by means of a transverse pin 54 in the lug 52 and extending across a circumferential groove 56 in the stem. The stem 50 carries a hand nut 58, positioned on its forward end by which the wedge member 48 can be moved transversely of the plunger 16 to cause its upper face to be positioned at various elevations above the upper end of the plunger. A spring pressed plunger 60, carried by the wedge member 48, bears against the rear face of the nut 58 to maintain the wedge in adjusted position.

Figure 1:
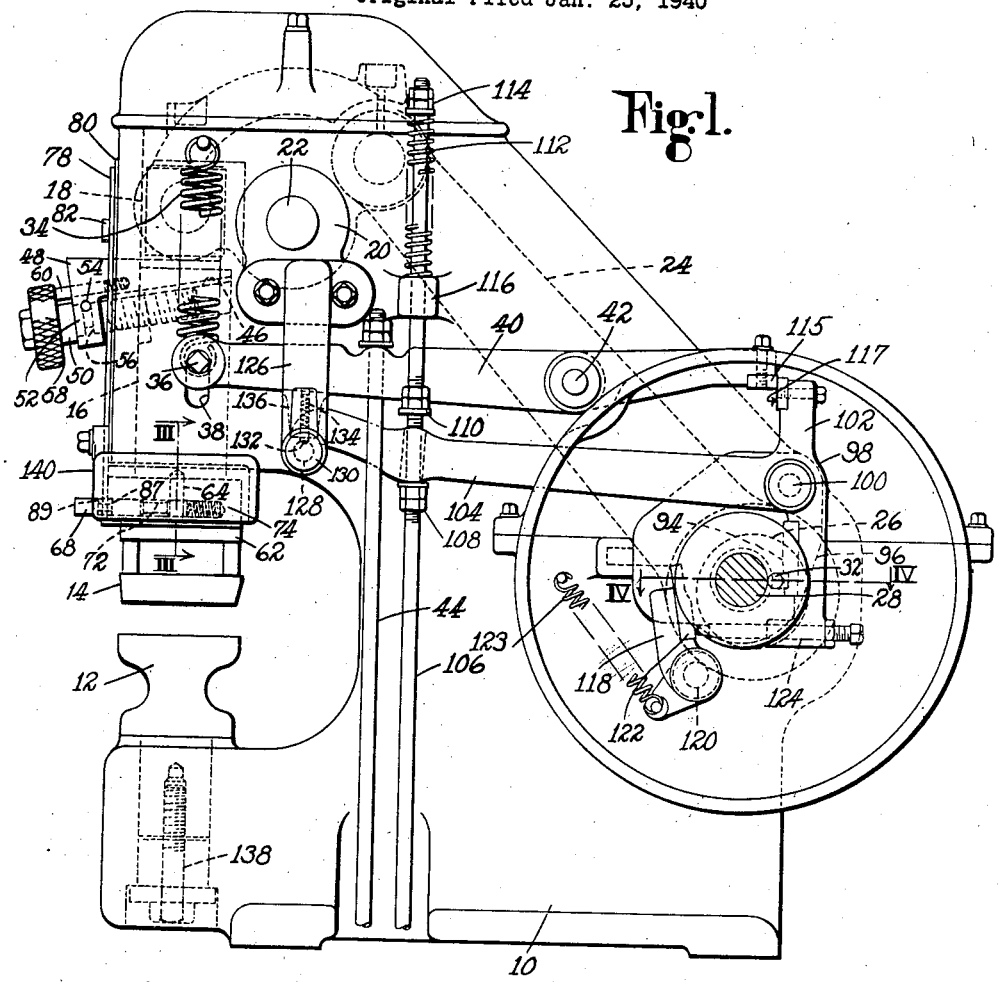
Fig. 1 is a view in side elevation, partly in section, of a cut-out machine embodying my invention.

To facilitate the assembly of dies of different sizes in the machine, each die is secured to a base plate 62 having a pair of split studs 64 (Fig. 3) extending from it and spaced apart laterally. The studs 64 fit tightly within vertical sockets 66 formed in the lower end of the plunger 16 and are held in position by a projecting stem 68 slidably positioned in the plunger and extending across grooves 70 in the studs. Just forwardly of that portion which engages the studs, the stem 68 is reduced in diameter, as shown at 72 in Fig. 1, to a size which is less than the distance between the studs. Thus, by pushing the stem 68 rearwardly against the action of a spring 74 behind it, the reduced portion of the stem can be brought opposite to the studs, which will enable the die to be removed from its block.

It will be understood that, if the upper face of the wedge member 48 has been adjusted to extend well above the upper end of the plunger 16, as would be necessary to ensure that a comparatively low die is driven completely through the work when the block 18 strikes against the wedge member, and if, then, a relatively high die were attached to the plunger 16 by mistake, there would be likelihood of damage to the machine when the power-operated block 18 was lowered, since there would be a tendency to drive the die into the work support. In view of this, means is provided for preventing the attachment to the plunger 16 of a die higher than that for which the setting of the wedge member 48 is intended to accommodate. This means is operative to prevent the attachment of any die to the plunger, except when the wedge member has been adjusted to a position suitable for the attachment of a die of the greatest height which it is expected to use, the operator thereafter readjusting the wedge member in accordance with the height of the die if the die is of less than the maximum height. To accomplish this, means is provided for preventing the stem 68 from being urged rearwardly until the wedge member 48 has been adjusted to its lowermost position relatively to the plunger 16. Accordingly, the upper face of the wedge member 48 is provided at its opposite sides with narrow, outwardly extending flanges 76, which are arranged to engage a vertical plate 78 lying against the forward face 80 of the machine frame. The plate 78 has an opening in it through which the wedge member 48 extends and has outwardly extending notches formed at opposite sides of the upper end of the opening to receive the flanges 76. The plate 78 is loosely held in position against the face 80 by studs 82 passing through vertical elongated slots 84 in the plate.

By reason of the engagement between the wedge member 48 and the plate 78, any heightwise adjustment in the position of the wedge member imparts a similar heightwise movement to the plate, which then slides along the face 80. When the wedge member 48 is so adjusted as to set the machine for use of dies of the maximum height, it will be adjusted outwardly to its greatest extent, so as to shorten the over-all length of the plunger 16 and the die, and in this position of the wedge member the plate 78 will occupy its lowermost position relatively to the plunger 16.

In order to prevent a die from being removed from the plunger 16 and another substituted for it, except at such time as the wedge member 48 is in the position just mentioned, the plate 78 is extended downwardly by a sufficient distance so as to pass below the die-retaining stem 68. The plate 78 is provided with a relatively short vertical keyhole slot 86, through which the stem 68 passes when the plate is in its lowermost position. The opposite sides of that part of the stem 68 lying adjacent to the slot 86 are slabbed off at 87 for a distance slightly greater than the thickness of the plate in order to provide the necessary clearance for the stem to lie within the slot. When the wedge member 48 occupies any adjusted position differing from its most forward position, the plate member occupies a position relatively to the stem 68 so that the latter passes through the narrow portion of the slot. In that position, the shoulder 89 formed on the stem will prevent the stem from being positioned rearwardly far enough to allow the die to be detached from the plunger 16. However, when the stem 48 is adjusted to its most forward position, the rounded upper end of the keyhole slot 86 will come into alinement with the stem 68 and thus allow the latter to be pushed rearwardly to permit removal of the die.

The mechanism for operating the clutch comprises on the drive shaft 28 a fastened boss 88 having mounted therein an axially slidable bolt 90, which is arranged to be moved endwise by an expansion spring 92 (Fig. 4) to cause the bolt to enter a hole in the driving pulley 30, thus to couple the pulley and shaft together for rotation in unison. When the machine is at rest, the clutch bolt 90 is held withdrawn from engagement with the driving pulley by a wedge block 94 secured to a depending arm 96 of a clutch control lever 98 pivotally mounted upon a pin 100 on the frame. The lever 98 has a relatively short arm 102 extending upwardly above the pivot and a relatively long third arm 104 extending forwardly in a substantially horizontal direction. A treadle lever 106 extends upwardly through an opening in the arm 104 and is provided with nuts 108 and 110 threaded on it above and below the arm at a slightly greater distance apart than the thickness of the arm, so that upon vertical movement the treadle lever will impart rising or falling movement to the arm 104, but will provide for some lost motion between the treadle lever and the arm. A compression spring 112, housed between a nut 114 at the upper end of the lever 106 and a fixed lug 116 on the frame, tends normally to raise the treadle lever and to maintain the clutch control lever 98 in such position as to hold the clutch bolt 90 in its withdrawn position. Before the die 14 is lowered into contact with the work, the rearward end 115 of the lever 40 for lowering it abuts against the forward face 117 of the upstanding arm 102, thereby preventing rotation of the latter in a counterclockwise direction, as would be necessary to withdraw the wedge block 94 from engagement with the clutch bolt 90. When, however, the lever 40 is moved to lower the die into engagement with the work, its rearward end will be raised out of contact with the arm 102, thus freeing the lever 98 for operation by the treadle lever 106. When the latter is depressed, the wedge block 94 will be moved rearwardly out of engagement with the clutch bolt 90, thus releasing the latter to action of the spring 92 to cause a coupling of the driving pulley 30 to the drive shaft 28.

Mechanism is provided to prevent inadvertent repetition of the operation of the machine and also to provide for a dwell of the die upon the work, if desired, as when the die includes heated embossing members. This mechanism causes the clutch to be automatically thrown out of operation when the block 18 is at the bottom of its stroke with the edge of the die in contact with the work support 12, after having cut through work positioned thereon. The mechanism comprises a clutch release lever 118 positioned at the forward side of the drive shaft 28 and mounted on a transverse pivot 120. At its upper end, diametrically opposite to the wedge block 94, the lever 118 carries a second wedge block 122 urged inwardly by a spring 123 to engage the clutch bolt 90 during the rotation of the drive shaft, and thus to withdraw the clutch bolt from the driving pulley when the shaft has made a half rotation and the block 18 actuated thereby is at the limit of its downward movement. This arrangement is such that the treadle lever 106 must be permitted to rise before the machine can complete its cycle and restore the die to its original raised position.

In order to cause the clutch bolt 90 to be reengaged, the arm 104 is provided with a forwardly extending rod 124 projecting in line with the lever 118. When the treadle lever 106 is allowed to rise, the clutch control lever 98 swings in a clockwise direction about its pivot (Fig. 1) and thus not only restores the wedge block 94 into position to withdraw the bolt 90, when the shaft has completed its rotation, but also causes the rod 124 to strike against the upstanding lever 118, and thus rock it forwardly to withdraw its wedge block 122 from engagement with the bolt thereby to allow the bolt to reengage the driving pulley and thus to cause the drive shaft to make the second half of its rotation.

It is sometimes desirable to prevent actuation of the clutch even after the die has been lowered into engagement with the work, for example in case it is desired to try out the effect of various adjustments of the machine, or to give mechanical attention to it. To accomplish this, the frame is provided with a downwardly extending bracket 126, which houses a transversely slidable rod 128 projecting horizontally towards the frame of the machine. The rod 128, when extending far enough toward the main body of the machine, lies underneath and close against the forward end of the arm 104 of the clutch control lever 98 and thus prevents rocking movement of this lever to operate the clutch, even though the treadle lever 106 has been depressed. When, however, it is desired to operate the machine in a normal manner, the rod 128 can be slid outwardly by means of a hand nut 130 to withdraw it from beneath the arm 104 and thus to allow the latter to be rocked freely by its treadle. In order to retain the rod 128 in either operative or inoperative position, the rod is provided with two shallow recesses, one of which is shown at 132, spaced apart along its axis, and a spring-pressed plunger 134 in the bracket 126 arranged to engage one or the other of said recesses. The rod 128 can also be slid toward the body of the machine sufficiently to underlie a downwardly extending boss 136 on the lever 40, so that the downward movement of the die by accidental tripping of the treadle rod 44 is prevented.

The work support 12 is detachably secured in place beneath the die 14 by a clamping bolt 138, which facilitates the location of beds of different sizes and shapes in the machine.

The lower end of the plunger 16 is enlarged to provide a substantial area of contact for the base plate 62 lying against it. In order to guard against the likelihood of the fingers of the operator being caught between the base plate and the frame of the machine, the frame carries a shrouding member 140 which prevents entrance of the operator's fingers between the block and frame.

Having described my invention, what I claim as new and desire to secure by Letters Patent of the United States is:

A perforating machine comprising a work support, a die mounted for movement heightwise of the support, a pulley, a drive shaft, a clutch for connecting the drive shaft to the pulley, connections between the shaft and die for moving the die toward the work support, a clutch control lever, a treadle rod operatively connected to the control lever for initiating operation of the clutch, means operable upon release of the treadle rod after initiating a clutch operation to move the control lever into position to disengage the clutch after a single revolution of the shaft, a clutch release lever normally operative to disengage the clutch after power-operation of the die upon the work, and means carried by the control lever to render the clutch release lever inoperative to disengage the clutch after release of the treadle rod.

HUBERT BOOTHROYD.